United States Patent
Schwartz et al.

(10) Patent No.: US 7,011,492 B2
(45) Date of Patent: Mar. 14, 2006

(54) TURBINE VANE COOLED BY A REDUCED COOLING AIR LEAK

(75) Inventors: Eric Schwartz, Bombon (FR); Laurent Dubois, Dammarie les Lys (FR); Damien Redon, Issy les Moulineaux (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/776,280

(22) Filed: Feb. 12, 2004

(65) Prior Publication Data
US 2004/0208748 A1 Oct. 21, 2004

(30) Foreign Application Priority Data
Feb. 18, 2003 (FR) .................................. 03 01916

(51) Int. Cl.
*F01D 9/06* (2006.01)
(52) U.S. Cl. ..................................... 415/115; 416/96 A
(58) Field of Classification Search ................ 415/115, 415/116; 416/96 R, 96 A, 97 R
See application file for complete search history.

(56) References Cited

U.S. PATENT DOCUMENTS 5,609,466 A * 3/1997 North et al. ................. 415/115
6,089,822 A * 7/2000 Fukuno ....................... 415/115
6,345,494 B1 2/2002 Coslow
6,761,529 B1 * 7/2004 Soechting et al. .......... 415/115

FOREIGN PATENT DOCUMENTS

EP 0 860 587 A2 8/1998
EP 1 160 418 A2 12/2001

* cited by examiner

*Primary Examiner*—Christopher Verdier
(74) *Attorney, Agent, or Firm*—Oblon, Spivak, McClelland, Maier & Neustadt, P.C.

(57) ABSTRACT

A turbine vane includes a perforated liner defining an annular cavity between an outside wall of the liner and an inside wall of the vane, an air admission opening for feeding the inside of the liner with cooling air, and an air exhaust opening for exhausting a fraction of the cooling air from the vane. The liner is secured to the vane at one end and free at the other end to slide along an inside edge of the vane under the effects of relative thermal expansion between the liner and the inside wall of the vane. An annular gap between the free end of the liner and the inside edge of the vane defines a leakage zone for cooling air and the inside edge includes a recess for generating head loss in this leakage zone so as to reduce the flow rate of cooling air passing through the leakage zone.

19 Claims, 2 Drawing Sheets

TURBINE VANE COOLED BY A REDUCED COOLING AIR LEAK

FIELD OF THE INVENTION

The present invention relates to the general field of vanes for turbomachine turbines, and more particularly to turbine vanes having cooling circuits integrated therein.

PRIOR ART

In conventional manner, a turbomachine has a combustion chamber in which air and fuel are mixed prior to being burnt therein. The gas coming from the combustion chamber flows downstream away from the combustion chamber so as to feed a high-pressure turbine and a low-pressure turbine. Each turbine comprises one or more rows of stationary vanes (rows known as nozzles) alternating with one or more rows of moving blades (rows known as turbine wheels) spaced apart circumferentially around the turbine rotor. The vanes and blades of the turbine are subjected to the very high temperatures of the combustion gases, which temperatures are much higher than the temperatures which can be withstood without damage by vanes or blades that come into direct contact with said gases, which has the consequence of limiting their lifetime.

In order to solve this problem, it is known to provide such vanes with internal cooling circuits seeking to reduce their temperature by establishing organized circulation of cooling air inside each vane, associated with perforations through the wall of the vane for generating a protective film on its outside.

FIGS. 5 and 6 show a conventional structure for a cooled vane of the type having a liner as is currently fitted to certain aircraft engines.

The vane 10 comprises a hollow blade 12 inserted between an outer platform 14 and an inner platform 16, with a liner 18 defining an annular peripheral cavity 20 between the inside wall of the blade and the outside of the liner. At its top end 18A, the liner is fixed in a leaktight manner to the outer platform of the vane by welding or brazing, and its bottom end 18B is engaged in the inner platform of the vane in a guide zone 16A leaving a determined clearance needed for assembly and to allow the liner to slide under the effects of differential thermal expansion. In the configuration shown, studs 22 secured to the inside wall or formed by projections from the liner serve to maintain constant spacing between the liner and said inside wall.

The liner 18 is of the multiply-perforated type so that the flow of cooling air delivered by a source of air under pressure (generally the compressor of the turbomachine) penetrates into the outer platform 14 via an inlet orifice 24 and reaches the inside of the liner 18, with part of the air escaping through the multiple perforations of the liner so as to form jets of air in the peripheral cavity 20, which jets cool the inside wall of the blade 12 by impacting thereagainst, and are subsequently exhausted through calibrated holes 25 formed through the trailing edge or through the pressure side of the blade so as to form a protective film of air (bridges 26 may be provided inside the blade to organize cooling air circulation therein). The remaining flow of air leaves via the inner platform 16 through which it passes, thereby cooling it, so as to be exhausted through an outlet orifice 28 away from the vane and towards other members of the engine that need to be cooled.

Because of the clearance that exists between the bottom end of the liner 18B and the zone 16A of the inner platform against which said liner slides, cooling air necessarily leaks therethrough, with consequences on the pressure balance between the outlet from the liner at its bottom end 18 and the peripheral cavity 20. Thus, if the outlet pressure from the liner is greater than the pressure existing in the cavity, a flow of air will rise into the cavity leading to a corresponding decrease in the flow for cooling external members and the vane. Conversely, with a lower pressure at the outlet from the liner, air that has contributed to cooling the inside wall of the liner will contribute to the flow for cooling external members, and that constitutes a severe drawback on the lifetime of the engine because of the increase in temperature that arises on coming into contact with the wall of the vane.

OBJECT AND BRIEF SUMMARY OF THE INVENTION

The present invention thus seeks to mitigate the drawbacks associated with such leaks of cooling air by proposing a turbine vane which significantly reduces leakage without requiring an additional sealing system to be inserted since that would present the major drawback of impeding sliding of the liner. Another object of the invention is to provide a vane of shape and thus manufacturing process that are modified very little compared with the traditional manufacturing process by casting, so as to avoid any deterioration in the general mechanical behavior of the vane. Finally, the invention provides any turbomachine turbine fitted with such cooled vanes.

To this end, the invention provides a turbomachine turbine vane including a multiply-perforated liner defining an annular cavity between an outside wall of the liner and an inside wall of the vane, an air admission opening for feeding the inside of the liner with cooling air and an air exhaust opening for exhausting a fraction of the cooling air from the vane, the liner being secured to the vane at one end and being free at the other end to slide along an inside edge of the vane under the effects of relative thermal expansion between the liner and the inside wall of the vane, the annular gap between said free end of the liner and the inside edge of the vane defining a leakage zone for cooling air, wherein said inside edge includes a recess for generating head loss in said leakage zone so as to reduce the flow rate of cooling air passing therethrough.

As a result, by establishing head losses in the leakage zone, the rate at which cooling air leaks through is greatly reduced. Thus, this particular shape for the liner guide section enables the leakage flow rate to be reduced by about 25% compared with the flow rate normally observed for this type of vane having a liner, and does so without significantly modifying the method of manufacturing the vane (all that is required is a minor modification to the core of the mold used for making the inner platform). In addition, the absence of any sealing system makes it possible to avoid impeding sliding of the liner in the vane.

Depending on the intended embodiment, said recess can occupy all or part of the periphery of said inside edge and it is advantageously circularly symmetrical in shape. It may comprise a rectangular section groove, or a corrugated section groove preferably including at least one indentation.

The invention also provides any turbomachine turbine provided with a plurality of cooled vanes as defined above.

BRIEF DESCRIPTION OF THE DRAWINGS

Other characteristics and advantages of the present invention appear from the following description made with reference to the accompanying drawings which show an embodiment having no limiting character, and in which.

DETAILED DESCRIPTION OF AN EMBODIMENT

Figure 1:
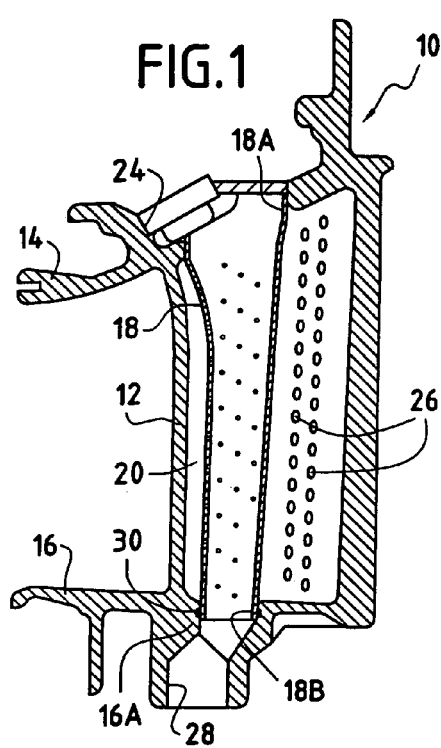
FIG. 1 is a perspective view of a turbine nozzle vane of the invention.
Figure 5:
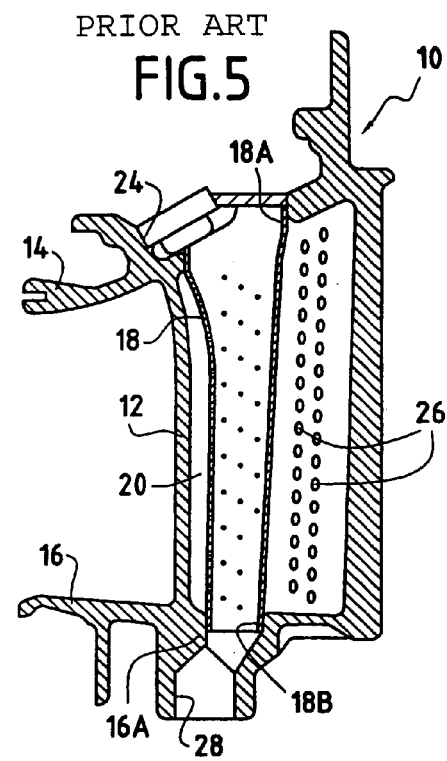
FIG. 5 is a perspective view of a prior art turbine nozzle vane.
Figure 6:
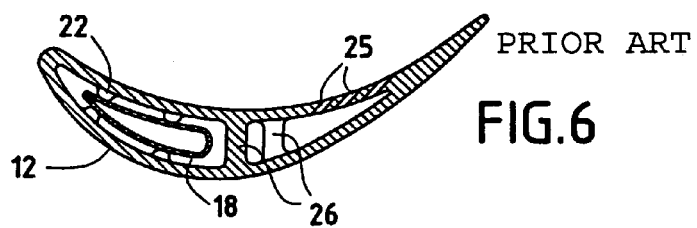
FIG. 6 is a section view of the FIG. 5 vane.

FIG. 1 is a perspective view of a cooled vane 10 of the invention, e.g. a vane for a turbomachine turbine nozzle. This vane comprises a hollow member 12 mounted between an outer platform 14 and an inner platform 16 and it is fixed to a casing (not shown) of the turbine via the outer platform defining an outside wall for the stream of combustion gas flowing through the turbine, the inside wall of the stream being defined by the inner platform of the vane.

Such a vane is subjected to the very high temperatures of the combustion gases and therefore needs to be cooled. For this purpose, and in a conventional manner, the vane 10 contains at least one multiply-perforated liner 18 fed with cooling air through one of its radial ends, and which cooperates with the blade to define an annular peripheral cavity between the inside wall of the blade and the outside wall of the liner. At its top end 18A, the liner is fixed in a leaktight manner to the outer platform 14 of the vane by welding or brazing, and at its bottom end 18B the liner is engaged in the inner platform 16 of the vane in a guidance or sliding zone 16A, leaving an annular gap 21 establishing a determined clearance needed for mounting and sliding of the liner in operation, given the way in which the temperatures of the various components of the vane vary differently and thus are subjected to differential expansion, and also needed as a leakage zone for the cooling air. Air admission openings 24 and exhaust openings 28 are provided in the outer and inner platforms respectively for circulating cooling air.

Figure 2:
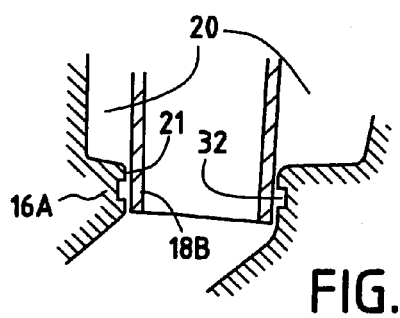
FIG. 2 is a detail view of FIG. 1 showing a leakage zone in a first embodiment of the invention.
Figure 3:
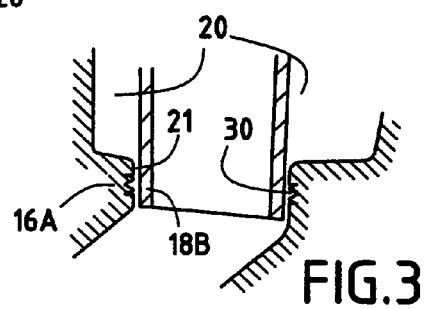
FIG. 3 is a detail view of FIG. 1 showing a leakage zone in a second embodiment of the invention.
Figure 7:
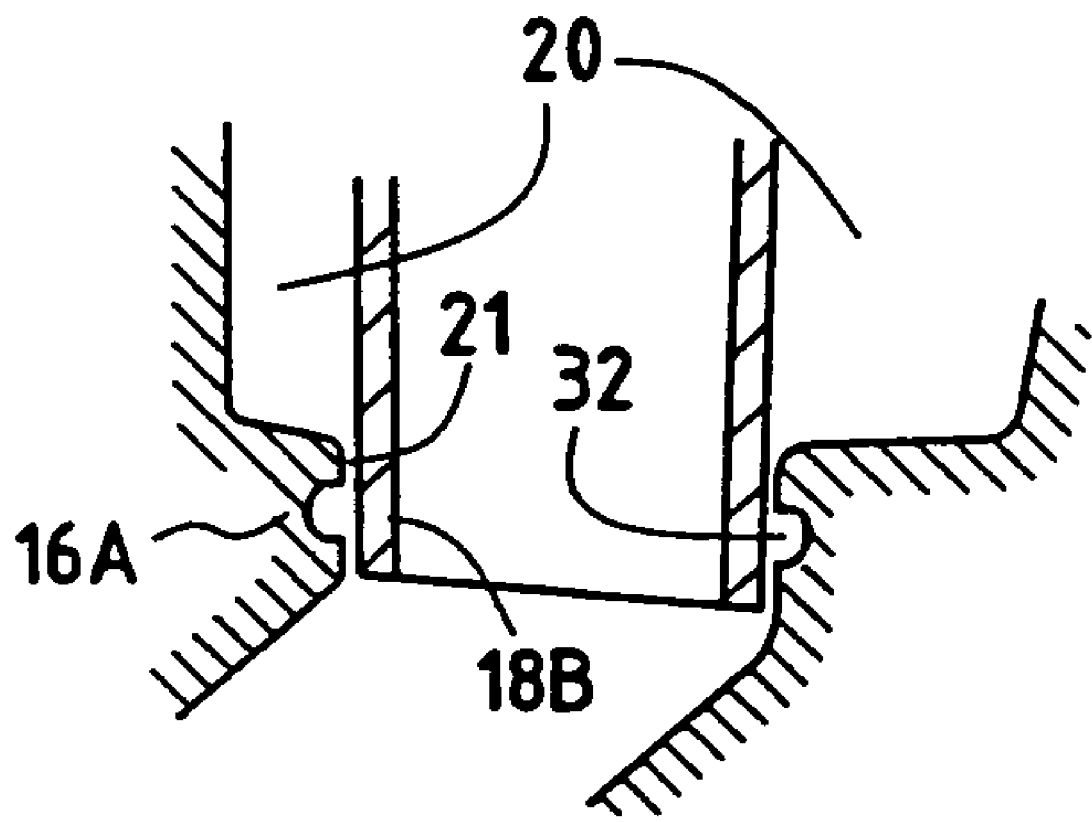
FIG. 7 is a detail view of FIG. 1 showing a leakage zone in another embodiment of the invention.

In the invention, it is proposed to establish head losses in the leakage zone so as to reduce the flow rate of cooling air passing therethrough. For this purpose, and as shown in the embodiment of FIGS. 2 and 3, the sliding zone 16A at the bottom end of the liner 18 in register with the inner platform 16 is provided with a recess 30 formed in all or part of the periphery of said zone in the form of a small notch or groove of shape and dimensions that depend on the desired leakage rate. This recess is preferably circularly symmetrical (i.e. cicumferential), e.g. being annular or elliptical, as shown in FIGS. 2 and 7, respectively. As also illustrated in the figures, in one of the embodiments of the present invention, the circular groove is disposed along an azimuthal direction of the end of the liner.

In FIG. 2, the recess is formed merely by a rectangular section groove 32. The inventors have been able to demonstrate with this simple shape that the increase in head losses induced by the groove leads to a non-negligible reduction in the rate of cooling air flow through the leakage zone, when compared with the prior art shape having no recess. Thus, for a groove having a width of 2 millimeters (mm) and a depth of 0.6 mm, this reduction is about 12%.

Figure 4:
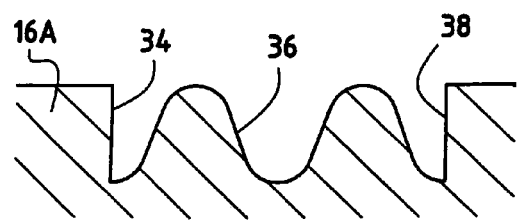
FIG. 4 is a magnified view of a portion of FIG. 3.

In FIG. 3, the recess is formed by corrugations of shape shown more clearly in the detailed view of FIG. 4. There are three indentations 34, 36, and 38 serving to break up the leakage flow three times in succession. The number of indentations and the shape of the indentations are naturally not limiting in any way and the person skilled in the art can determine said number and shapes depending on the required flow characteristics. In this case also, the inventors have been able to demonstrate that with such a shape, the increase in head losses due to such corrugations provides a non-negligible reduction in the cooling air flow rate through the leakage zone, not only compared with the prior art shapes but also compared with a rectangular section groove having the same size. With the corrugated shape, a flow rate reduction of about 25% is obtained (nearly twice that obtained with the preceding embodiment), with three indentations having a depth of 0.6 mm (radius of curvature 0.2 mm) in a groove having a total width of 2 mm.

With this invention, the process of manufacturing a vane is not modified in any way, it suffices merely to make a minor adaptation matching the desired shape for the recess in the mold core used for making the inner platform of the vane. In addition, since no gasket or other sealing system is inserted in the leakage zone, there is no risk of the liner jamming as it slides under the effect of differential expansion.

What is claimed is:

1. A turbomachine turbine vane comprising a multiply-perforated liner defining an annular cavity between an outside wall of the liner and an inside wall of the vane, an air admission opening for feeding the inside of the liner with cooling air and an air exhaust opening for exhausting a fraction of the cooling air from the vane, the liner being secured to the vane at a first end and being free at a second end to slide along an inside edge of the vane under the effects of relative thermal expansion between the liner and the inside wall of the vane, an annular gap between said free end of the liner and the inside edge of the vane defining a leakage zone for cooling air, wherein said inside edge comprises a groove for generating a head loss in said leakage zone so as to reduce a flow rate of cooling air passing through said leakage zone, and said groove comprises a rectangular section groove.

2. The vane according to claim 1, wherein said groove is made over all or part of the periphery of said inside edge.

3. The vane according to claim 2, wherein said groove is circularly symmetrical.

4. A turbomachine turbine, comprising a plurality of cooled vanes according to claim 1.

5. A turbomachine turbine vane comprising a multiply-perforated liner defining an annular cavity between an outside wall of the liner and an inside wall of the vane, an air admission opening for feeding the inside of the liner with cooling air and an air exhaust opening for exhausting a fraction of the cooling air from the vane, the liner being secured to the vane at a first end and being free at the other end to slide along an inside edge of the vane under the effects of relative thermal expansion between the liner and the inside wall of the vane, an annular gap between said free end of the liner and the inside edge of the vane defining a leakage zone for cooling air, wherein said inside edge comprises a groove for generating a head loss in said leakage zone so as to reduce a flow rate of cooling air passing through said leakage zone, and said groove comprises a corrugated section groove.

6. The vane according to claim 5, wherein said corrugated section groove comprises at least one indentation.

7. A turbine vane, comprising:
a liner defining an annular cavity between an outside wall of the liner and an inside wall of the vane, an end of the liner and the inside edge of the vane defining an air leakage passage;
an intake opening for feeding the inside of the liner with cooling air;
an exhaust opening for removing a fraction of the cooling air from the vane; and
a groove in the air leakage passage, the groove being disposed in the vane and being configured to generate a head loss in the air leakage passage so as to reduce a flow rate of air passing through the air leakage passage.

8. The vane according to claim 7, wherein the groove is made over a peripheral portion of the inside edge.

9. The vane according to claim 7, wherein the groove is made over an entire peripheral portion of the inside edge.

10. The vane according to claim 7, wherein the groove is a circular groove disposed along an azimuthal direction of the end of the liner.

11. The vane according to claim 7, wherein the groove is a rectangular groove.

12. The vane according to claim 7, wherein the groove is a groove with a corrugated cross section.

13. The vane according to claim 12, wherein the corrugated cross section comprises at least one indentation.

14. The vane according to claim 12, wherein the corrugated cross section comprises three indentations.

15. The vane according to claim 14, wherein a depth of each indentation is 0.6 mm and a radius of curvature of each indentation is 0.2 mm.

16. The vane according to claim 15, wherein a total width of the groove is 2 mm.

17. The vane according to claim 7, wherein the groove is annular.

18. The vane according to claim 7, wherein the groove is elliptical.

19. A turbomachine turbine, comprising:
a plurality of vanes according to claim 7.

* * * * *